Mar. 3, 1925.                                           1,528,729
H. A. HOUSE, JR
DETACHABLE WHEEL
Original Filed Feb. 10, 1916          2 Sheets-Sheet 1
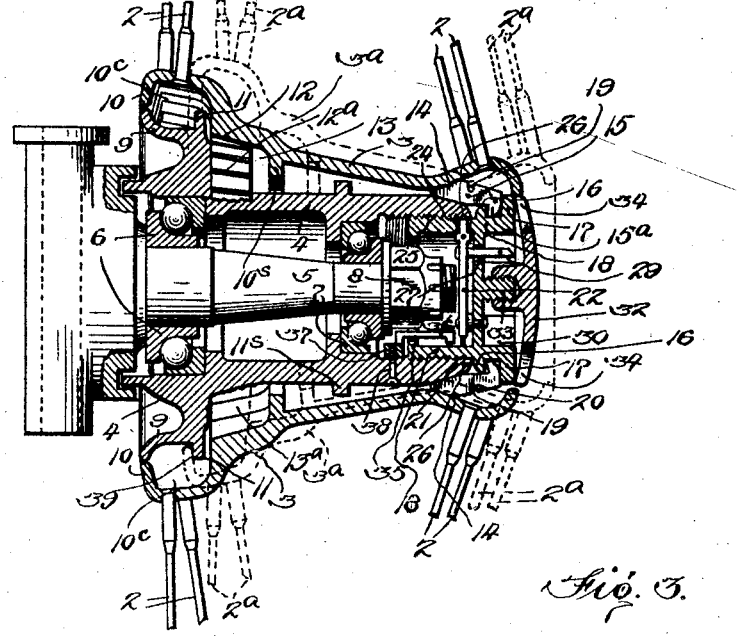
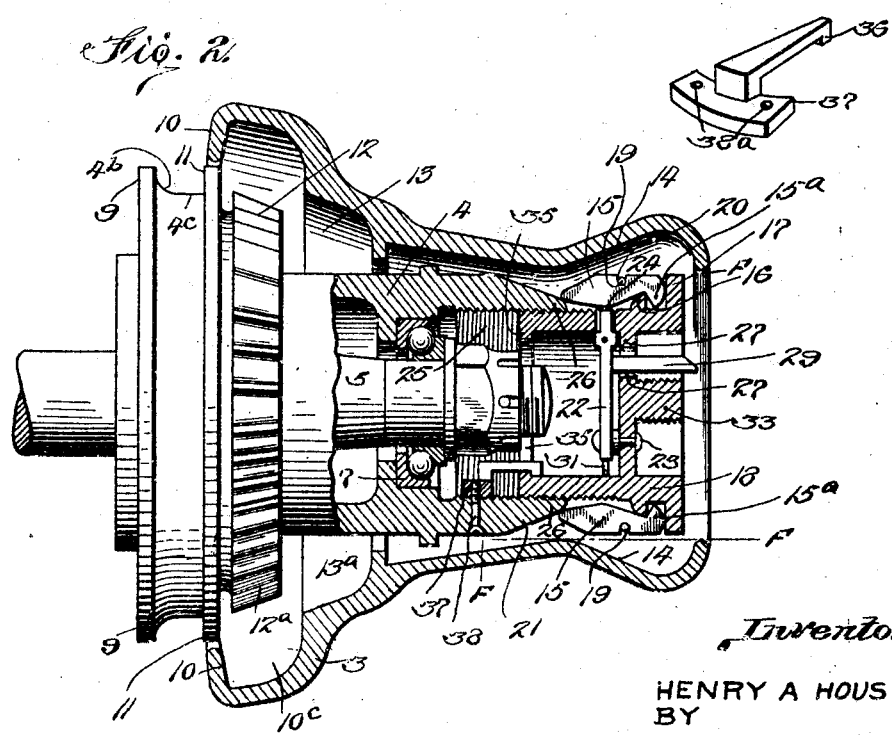
Inventor:
HENRY A HOUSE Jr.
BY
Clarence S. Walker
HIS ATTORNEY Mar. 3, 1925. 1,528,729
H. A. HOUSE, JR
DETACHABLE WHEEL
Original Filed Feb. 10, 1916   2 Sheets-Sheet 2
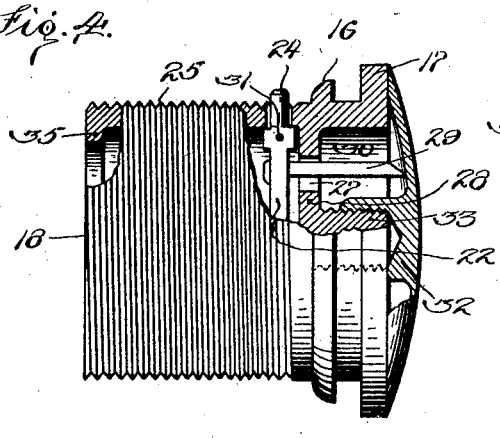
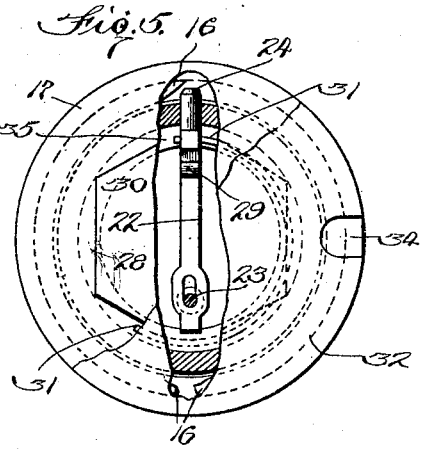
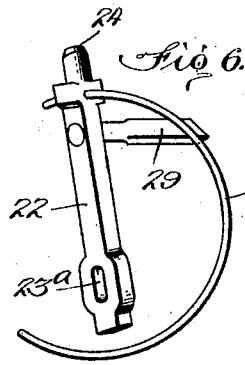
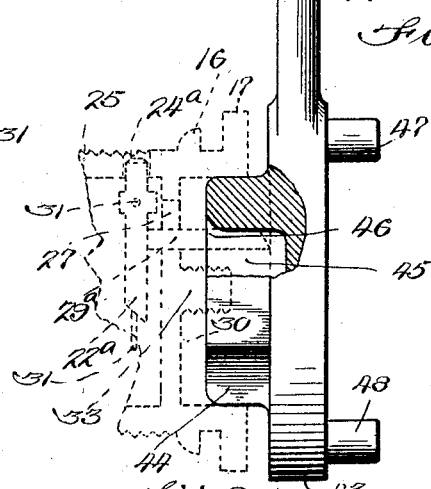
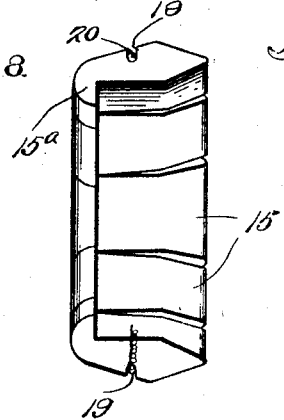
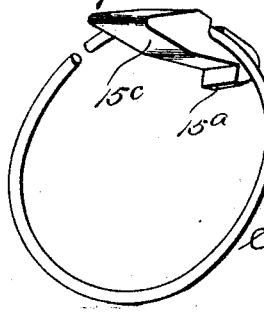
Inventor:
HENRY A. HOUSE Jr.
BY
Clarence S Walker
HIS ATTORNEY Patented Mar. 3, 1925.

1,528,729

UNITED STATES PATENT OFFICE.

HENRY A. HOUSE, JR., OF BUFFALO, NEW YORK, ASSIGNOR TO WIRE WHEEL CORPORATION OF AMERICA, OF NEW YORK, N. Y., A CORPORATION OF NEW YORK.

DETACHABLE WHEEL.

Original application filed February 10, 1916, Serial No. 77,441. Patent No. 1,363,598, dated December 28, 1920. Divided and this application filed September 15, 1919. Serial No. 323,955.

*To all whom it may concern:*

Be it known that I, HENRY A. HOUSE, Junior, a citizen of the United States, and resident of Buffalo, Erie County, State of New York, have invented certain new and useful Improvements in Detachable Wheels, of which the following is a specification.

This application is a division of my application Serial No. 77441 filed February 10, 1916, matured as Patent No. 1,363,598 on December 28, 1920.

This invention relates to detachable wheels and particularly to that class thereof which have hubs composed of inner hubs and outer hub shells.

The inner hub of this class of wheel, whether the wheel be a driving or driven wheel is designed to remain engaged with its axle or shaft and is held against longitudinal displacement thereon, while the outer hub shell is removably attached to and co-fits with the inner hub.

Figure 1 is a sectional elevation of a hub of a detachable wire wheel embodying my invention also showing fragments of spokes and rims attached.

Figure 2 is a sectional elevation of hub shown in Fig. 1, but showing here, the holding nut partly unscrewed, allowing the outer hub shell to be withdrawn during the threaded engagement of the holding nut with the inner hub.

Figure 3 is a perspective view of the nut stopping device shown in Figs. 1 and 2, and used to limit the outward travel of the holding nut, to prevent its being taken off.

Figure 4 is a side elevation of the special form of holding nut shown in section in Figs. 1 and 2, being broken away to show its internal construction and the relative positioning of the nut locking device.

Figure 5 is a fragmental large end elevation of the nut shown in Fig. 4.

Figure 6 is a perspective view of the bolt of the said nut locking device, showing a fragment of a spring coil attached.

Figure 7 is a side elevation of the special wrench adapted to fit the nut and name plate shown in Figures 4 and 5.

Figure 8 is a side elevation of half an expansible segmental ring.

Figure 9 is a perspective view of a single segment of said ring, shown in Figs. 1 and 8, also showing a split spring coil attached.

In Figure 1, 4 is the inner hub journaled on the stub shaft 5, of a front wheel, by means of ball bearings 6 and 7. The nut 8 holds the ball bearings, with the inner hub 4, longitudinally. Upon the large end of the inner hub 4 is shown the curved enclosing flange 9, which is fitted close to, and is concentric with, the inturned flange 10 of the outer hub shell 3 in its co-fitting position with the inner hub 4. Spaced outwardly from the curved enclosing flange 9 is the annular projection 11 on the inner hub 4. Near the center of the inner hub 4 is shown an annular projection $11^s$, and within the hub shell 3, is shown an annular projection $10^s$, between the flange 10 and the projection $11^s$. The flange 10 and the projection 11 constitute one set of hub shell arresting means, and annular projections $10^s$ and $11^s$ constitute another set of hub shell arresting means; the relative diameters of the said projections, in each of the said sets being such as to permit of said projections passing one another when in concentric position, and to come in shouldered engagement with one another, when the hub shell 3 is moved longitudinally and eccentrically from its cofitting position with the inner hub 4. The projections $10^s$ and $11^s$ are so spaced longitudinally, as to come into shouldered engagement after a failure of the flange 10 to engage or remain engaged with the projection 11, during an off-movement of the hub shell 3 from the inner hub 4. Positioned close to the projection 11, within the hub shell 3 and on the inner hub 4 is shown formed another and broader annular projection marked 12, having upon its periphery, a conically formed set of regularly spaced corrugations $12^a$, concentrically positioned with respect to the axis of the inner hub 4, and converging toward a common point on the axis of the inner hub 4. A correspondingly formed corrugated recess 13 with corrugations $13^a$ co-fits with the corrugated surface of the annular projection 12, and interlocked with the said projection 12 forms an anti-turning means preventing the rotation of the hub shell 3 upon the inner hub 4 and at the same time acts to center the said hub shell 3 upon the said inner hub 4 at their large ends, besides performing the function of an opposing tapered surface co-acting, longitudinally, with another member having a complemental tapered surface in the small end of the co-fitting hub parts. Through the intermeshed corrugations of the projection 12 and the recess 13 is transmitted the driving or rotating force; in the case of the rear wheels the inner hubs drive the wheels, while in the case of the front wheels the reverse is true and the wheels rotate the inner hubs. Within the small end of the hub shell 3 is a conical surface 14, shown engaging wedge shaped segments of a segmental clamping ring 15, engaged between the annular projections 16 and 17, of the holding nut 18, by the hook ends 15ª. A peripheral spiral spring 19, in tension, occupies an annular groove 20 on the segments of the ring 15. The said segmental ring 15 is shown also in bearing contact with the small outwardly converging conical end 21, of the inner hub 4. Positioned for reciprocal movement radially within the nut 18 is the bolt 22, in slotted engagement at its inner end with a rivet 23, and it has its outer end 24, protruding beyond the threads 25 of the nut 18, and engaging one of a series of notches 26, in the small end on the inner hub 4. Integral with the bolt 22 and extending longitudinally outward through a slot 27 in the wall 28 of the nut 18, is the arm 29, having its outer end beveled, for depressing engagement with a wrench fitted into a polygonal recess 30 of the nut 18, the bolt 22 being spring-pressed outwardly by a spring coil 31, to engage a notch 26, but released therefrom, when a suitable wrench depresses the arm 29. A name plate cap 32, threaded with the central post 33 is provided with two notches 34, 34 adapted to receive a spanner wrench. To limit the outward movement of the nut 18, I provide an inturned flange 35 on the inner end of the nut 18, adapted to engage a hook 36, having a base 37 screwed to the inner hub 4 by screws 38.

In Figure 2, the nut 18 is shown partially unscrewed from the inner hub 4, and in such a position as to cause the inturned flange 35 to engage the hook 36. The segmental ring 15, in hooked engagement with the annular projection 16, is shown contracted, by the spring 19 and near the extreme end of the conical part 21, of the inner hub 4, it contacts the inner hub 4. The ring 15, is shown to be contracted by the spring 19 to come within the lines F—F, which lines are parallel and drawn tangent to the inner surface of the smallest part of the neck of the outer hub shell 3. The contracted outside diameter of the ring 15, being thus less than that of the inside of the smallest part of the neck of the outer hub shell 3, permits the free taking off of the said hub shell 3, during the threaded engagement of the nut 18 with the inner hub 4.

In Figure 3, the hook 36 extends from the curved base 37 which is provided with threaded holes 38ª adapted to engage screws 38, shown in Figs. 1 and 2.

In Figure 4, the holding nut 18 is broken away to show the inturned flange 35 and the installation of the bolt 22, within the nut 18.

In Figure 5, is shown the bolt 22 and the spring coil 31 adapted to force the bolt 22 outward, so that its end 24 projects beyond the threads 25. The lower end of the coil 31 is in pressing contact with the inner curved wall of the nut 18.

In Figure 6, the connection of the spring coil 31 with the bolt 22 is clearly shown. The slot 23ª is adapted for sliding engagement with the rivet 23, shown in Figs. 1, 2, and 5.

In Figure 7, is shown the wrench adapted for use with the nut and its cap 32. 42 is a fragment of the handle, 43 is a disk, integral with the handle. Upon the disk 43 is a hexagonal boss 44, having a circular recess 45 with a beveled edge 46. The boss 44 is adapted to enter the recess 30 in the nut 18. For taking off cap 32, pins 47 and 48, projecting from the disk 43, form therewith a spanner wrench for engagement with notches 34 in the cap 32, shown in Fig. 5.

In Figure 7, a fragment of the nut 18 is shown dotted, to represent the relative position of the boss 44, with reference to the nut and its locking means, when the wrench is fitted into the recess 30 of the nut 18. The arm 29ª, with the bolt 22ª, shows the depressed position taken by the bolt 22 and its arm 29, when the arm 29 engages the wall of the circular recess 45, of the wrench. The beveled edge 46 assists in depressing the arm 29, as it enters the recess 45. The end 24ª of the bolt 22ª is here shown depressed below the threads 25, allowing the free turning of the nut 18 by the wrench.

In Figure 8, the side elevation of half the ring 15, clearly shows the internal construction of the segments assembled in expanded position and surrounded by a spiral spring 19.

In Figure 9, a split spring coil 19ª is shown as a substitute for the spiral spring 19, and occupies the groove 20 in the segment 15ᶜ. This coil 19ª is made of such a normal diameter, that when occupying the recess 20, of the ring 15, it will normally tend to hold the segment spring pressed, when open or closed, together.

In use, referring to Fig. 1, the inner hub 4 is first journaled on the axle 5 with the ball bearings 6 and 7 and is fixed longitudinally thereon by means of the nut 8. The outer hub shell 3, is built attached to the rim by means of the spokes 2, so that the rim and the spokes 2 go on or off with the outer hub shell 3. As far as the detachable feature of the wheel is concerned, the inner hub 4 is allowed to remain on the axle 5 after slipping the wheel off. After journaling and fixing the inner hub 4, longitudinally, upon the axle 5, the rest of the wheel is positioned by slipping the outer hub shell 3 into co-fitting position with the inner hub 4, the outside diameter of the annular projection 11, being a trifle smaller than the inner diameter of the flange 10, the said projection 11 is adapted to pass said flange 10. The corrugations of the conical corrugated surfaces of the respective annular projection 12 and the annular recess 13 become intermeshed and at the same time center the large end of the outer hub shell 3 with that of the inner hub 4.

The nut 18, bearing the segmental ring 15, is next threaded with the inner hub 4. Before mounting the nut 18 the screws 38 by which hook 36 is held in place to engage the flange 35 are loosened so that the flange passes inside the hook. The screws are then tightened so that the hook will act to limit the outward movement of the nut. A wrench is next positioned having its boss 44 within the recess 30 of the nut 18, as shown in Figure 7. During this engagement the arm 29 and the bolt 22, are depressed, so that the end 24 of the bolt is below the threads 25. As the wrench is turned to screw on the nut, the beveled end of the segments of the ring 15 engage the conical end 21 of the inner hub 4 and sliding thereon, expand and move longitudinally inward until the ring 15 comes into engagement with the conical surface 14 of the outer hub shell 3. A further movement of the nut 18 inward causes a drawing together of the hub parts 3 and 4. Upon withdrawing the wrench, the end 24 of the bolt 22, is free, to engage one of the notches, 26, being normally actuated outward by the spring 31. The bolt 22 will engage one of the notches 26 at the instant of registration therewith and remain in this locked position, until the wrench is again applied to engage the nut 18. The cap 32 is next screwed upon the post 33, by means of a spanner wrench, having two pins adapted to engage the notches 34, 34. The operation of the wrench in depressing the outer end of the bolt out of engagement with any of the notches 26, is described in connection with Fig. 7.

The form of construction illustrated and described herein, may be modified and not depart from the spirit and scope of my invention. I, therefore, do not wish to be confined to the exact structure illustrated and described above.

I claim,

1. In a wheel, a hub including an inner hub member and an outer hub member, said inner hub member having an outwardly converging conical end on its outer surface, the outer hub member having an outwardly diverging conical interior surface, contiguous to the conical end of said inner hub member in the normal assembled position of said hub members, spacing means adapted to fit between the said conical surfaces of said hub members, said spacing means being adapted for sliding engagement with the conical end of said inner hub member, means engaging said inner hub member and operating to force said spacing means to slide on the conical end of inner hub member, causing said spacing means to move radially into engagement with the outer hub member thereby fixing said members relative to one another, means for moving said spacing means toward the axes of the hub members, when released by the engaging means, said spacing means, when in released position, permitting the outer hub member to pass off from the inner hub member.

2. In a wheel, a hub including an inner hub member, having an outwardly converging conical end, on its outer surface, and a threaded recess in the end thereof, an outer hub member, co-acting, inter-engaged elements for relatively positioning said inner and outer hub members at the inner end of the hub, a threaded nut engaging said threaded recess in said inner hub member, a split ring mounted on said threaded nut and movable longitudinally of the inner hub member, said split ring being adapted for sliding engagement with the conical surface at the outer end of the inner hub member, said outer hub member having an outwardly diverging conical interior surface, adapted to be engaged by said split ring, whereby the split ring, wedging between the conical surfaces on the inner end and outer hub members, mutually positions the outer ends of the hub members and holds in engagement the co-acting members, at the inner hub end of the hub, means for limiting the outward movement of the threaded nut in said recess, means for retracting the sections on the split ring as the nut is moved toward its outer limit, said split ring, when in released position, permitting the outer hub member to pass off from the inner hub member.

3. In a detachable wheel the combination of an inner hub part, an outer hub part held against relative rotation thereon, and means carried by and having threaded engagements with one of said parts for forcing said hub parts into operative relation, said means including elements which are forced by the means carrying part into contact with the other part when such means are tightened and which are withdrawn from such contact when the means are loosened thus permitting the removal of the outer hub part without necessitating the removal of said means.

4. In a detachable wheel the combination of an inner hub, an outer hub shell held against relative rotation thereon, and means in threaded engagement with said inner hub for holding the hub shell in position, said means including elements which are forced by the end of the inner hub into engagement with the hub shell when said means is tightened and which are contracted when the means are loosened, thus permitting removal of the hub shell without necessitating removal of said means.

5. In a detachable wheel, the combination of an inner hub member, an outer hub shell, said member and shell having tapered co-acting surfaces at the inner ends thereof and oppositely inclined tapered surfaces at the outer ends thereof and means threaded to said hub member, said means including devices normally engaging the tapered surface of said hub member and expansible into engagement with the tapered surface of said hub shell to force the shell into engagement with the hub member at the inner tapered surfaces when said means are turned in one direction, and contractable to permit the removal of the hub shell thereover without necessitating the removal of the means when said means are turned in the opposite direction.

In testimony whereof I affix my signature.

HENRY A. HOUSE, Jr.